(12) United States Patent
Wiklund

(10) Patent No.: US 6,617,601 B1
(45) Date of Patent: Sep. 9, 2003

(54) MOLTEN METAL POURING CONTROL SYSTEM AND METHOD

(75) Inventor: Peter Wiklund, Göteborg (SE)

(73) Assignee: LMI Technologies Inc., Delta (CA)

( * ) Notice: Subject to any disclaimer, the term of this patent is extended or adjusted under 35 U.S.C. 154(b) by 0 days.

(21) Appl. No.: 09/801,939

(22) Filed: Mar. 9, 2001

Related U.S. Application Data

(60) Provisional application No. 60/188,164, filed on Mar. 10, 2000.

(51) Int. Cl.[7] ............................................. G01N 21/86
(52) U.S. Cl. ............................. 250/559.29; 250/559.32; 250/577; 164/457
(58) Field of Search ....................... 250/559.27, 559.29, 250/559.3, 559.32, 559.33, 559.4, 559.38, 221, 223 R, 577; 164/457, 155.4, 155.2, 151.3

(56) References Cited

U.S. PATENT DOCUMENTS

| | | | |
|---|---|---|---|
| 4,134,444 A | * | 1/1979 | Fujie et al. ............... 164/155.2 |
| 4,667,231 A | | 5/1987 | Pryor |
| 4,724,894 A | | 2/1988 | Sjodahl |
| 5,362,970 A | | 11/1994 | Pryor et al. |

* cited by examiner

*Primary Examiner*—Que T. Le
(74) *Attorney, Agent, or Firm*—Paul Smith Intellectual Property Law; Paul Smith

(57) ABSTRACT

A method for controlling a molten metal pouring operation is disclosed which works in the presence of unusual pouring conditions such as typically encountered in aluminum casting and utilizes a laser type sensor, for example a triangulation based light section device, to monitor differences between a reference surface and the molten metal in a mold.

28 Claims, 6 Drawing Sheets

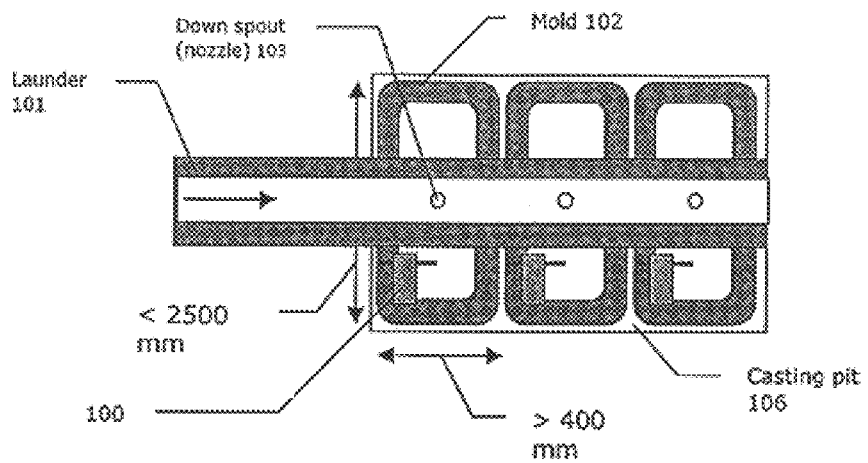
FIGURE 1A - PRIOR ART
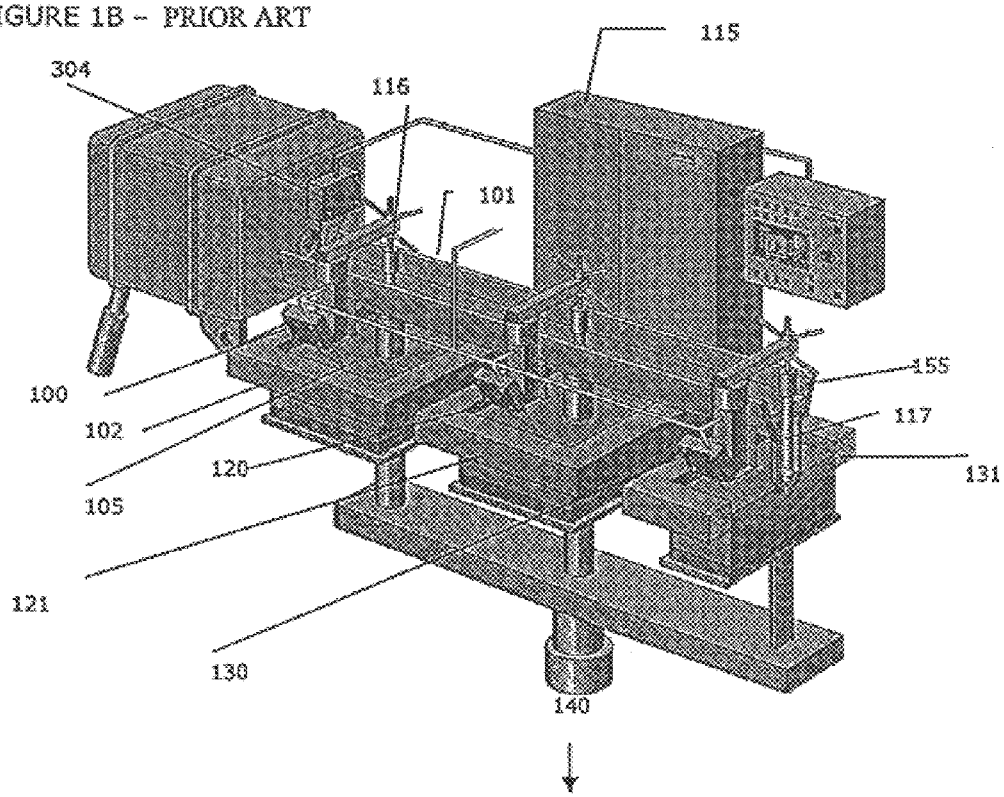
FIGURE 1B - PRIOR ART

MOVEMENT OF CASTING TABLE

Figure 2
FIGURE 2A
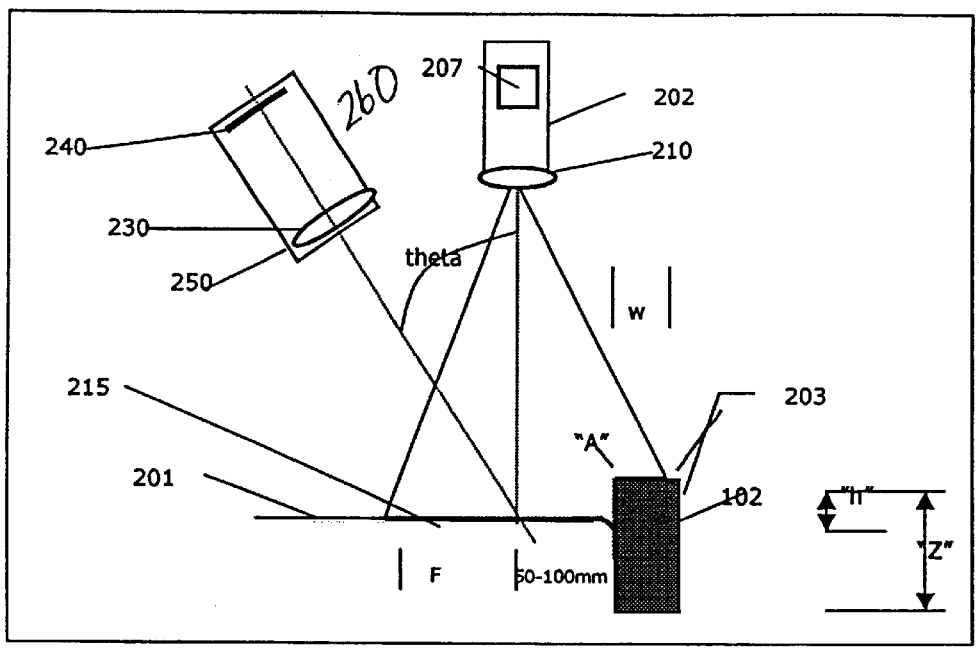
FIGURE 2B
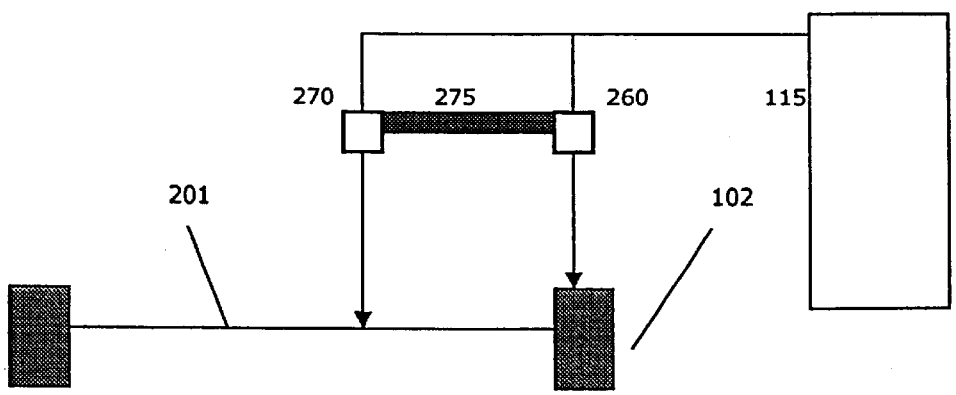

MOLTEN METAL POURING CONTROL SYSTEM AND METHOD

This application claims benefit of U.S. Provisional application S No. 60/188,164, filed Mar. 10, 2000.

Cross references to related applications by the inventor: None

Federally sponsored R and D statement—Not Applicable

Microfiche Appendix—Not Applicable

The disclosures of the following U.S. patents are incorporated herein by reference:

1. U.S. Pat. No. 4,724,894 by Sjodahl, describing a molten metal pouring control;
2. U.S. Pat. No. 5,362,970 by Pryor et al describing operation of photodetector array based and laser triangulation range sensors and other sensors;
3. U.S. Pat. No. 4,667,231, by Pryor, Electro-optical part inspection in the presence of contamination and surface finish variation.

Also incorporated by reference is the LMI Selcom CD ROM entitled "Aluminum Pouring" which illustrates prior art method of casting control

FIELD OF THE INVENTION

U.S. Pat. No. 4,724,894 by my colleague, Eric Sjodahl, discloses a method for controlling the pouring of molten metal in which a laser sensor is used to determine the height of metal being poured in to a mold. The instant invention is aimed at maximizing the accuracy (and thus productivity) of pouring control, particularly in casting aluminum, where unusual conditions exist both optically and mechanically which are not seen in iron casting applications.

BACKGROUND OF THE INVENTION

In practicing the teachings of the Sjodahl invention, I have found that calibration of molten metal level sensors for mold level control is essential, as is their operation over a wide range of unusual reflection conditions, particularly when pouring aluminum billets. Accuracy demands are most stringent in this application.

Typically the mold is made of steel. Aluminum is poured in the top of the mold, the sides of which are fixed. The bottom of the mold is on a movable ram, which is lowered as the mold is filled, with the open sides cooling in the process in the region below the mold, as the ram recedes into a cooling tank. When the ram is at its bottommost position, the billet is of the desired length (height).

Water is sprayed on the sides of the mold which can create steam, even though most modern systems have steam evacuation systems sucking from below. In addition, at the beginning of the pour, the mold side walls have some grease on them, which creates smoke as the molten material vaporizes the grease.

An important operational parameter is the measured height of metal in the mold, which also relates to the speed of lowering the ram and the pour rate. For a given pour rate, the ram cannot be lowered too fast, or the molten metal level can sink below the edge of the mold creating an explosion. However, it is desired to cast as low as possible in the mold to get the best surface result, and this makes the task of keeping the accuracy through the entire cast (the task of pouring into a mold) extremely important. I have found electro-optical sensors, and particularly laser triangulation type electro-optical sensors very effective for monitoring molten metal height in this application. However, sensing is made difficult because of the steam and smoke conditions which can occur. For example a projected laser spot can hit both steam and the metal below it. With lots of steam, one can get a false high reading (i.e., closer to the sensor) from the steam. In other circumstances as well there is need to discriminate against readings from locations other than the metal level surface itself.

Measurement is also difficult at times due to turbulence in the molten metal and sometimes strange reflections that can occur due to the high reflectivity of the material, the motion thereof, and the formation of oxide or other layers on its surface.

Accurate height measurement today is also difficult because the current method to ensure calibration is made only prior to a given cast. If the sensor is mounted to a straight feeding launder (the last part of a continuous trough-like vessel used to transfer the molten aluminum from the furnace to the mold, which may be 6–7 m long), this feed launder quite often can move out of position due to thermal distortion or other factors during a cast, causing a loss of accuracy in height measurement due to movement of the sensor.

In the art there are many discussions of aluminum casting issues (see for example, U.S. Pat. No. 5,875,832 by Senser, et al.). And there is a good commercial description of the use of laser sensors for pouring control in aluminum produced by my employer, LMI Selcom, referenced herein in CD ROM form. However, I have been searching for a solution to the problems encountered, and have found no example of others effort in regard to the particular aspects mentioned above, whose solution is desirably here disclosed.

SUMMARY OF THE INVENTION

I have found that the problems of sensing in the presence of obscuration due to steam and smoke, and reflectivity changes due to formation of surface layer oxides and turbulence, as well as the problems of calibration, can be advantageously solved with a novel sensor and data processing approach here disclosed. Numerous readings in both time and lateral position across the metal are taken to prevent transient effects from being counted using algorithms disclosed herein. This can be aided by using multiple laser spots or a projected laser zone, such as a line, rather than a spot, to provide more range points from the surface of the molten metal, also at different locations across the mold.

Calibration of the system is insured by measuring both the molten metal height and the mold location during the pour. The differential height between the two then gives an accurate reading of metal height in the mold irregardless of feeding launder position or any other displacement of the sensor mounting position. Preferably, one sensor, or alternatively, two sensors (one for metal, one for mold) can be used for this purpose. The sensors employed are preferably, but not necessarily, electro-optically based. It is also noted that this approach, because it is independent of feed launder mounting position, is not affected by removal of the feed launder for maintenance, refurbishment, or other purposes. This simplifies set-up.

In many cases too it is desired to control height of metal in the feeding launder as well, also made possible with the invention.

It is therefore a goal of this invention to disclose an improved means for metal pouring control, particularly, but not necessarily, for aluminum casthouse application.

It is a further goal to provide improved means for pouring even in the presence of unusual reflections, caused by oxide formation, turbulence and other effects.

It is a still further goal to provide a method for assuring calibration of the sensor baseline location to provide accurate pouring control, in the presence of thermally induced mechanical distortion and other problems.

It is another goal of the invention to provide simplified means of calibrating the system after each cast, even when equipment is removed It is still another goal to provide means for monitoring and controlling level in the feeding trough (launder) as well as molds being poured These and other desirable features of the invention are illustrated in the following figures

BRIEF DESCRIPTION OF THE DRAWINGS

FIGS. 2(A–B) illustrate the use of a sensor providing a line of data from the molten metal and providing local reference calibration for the sensor, optionally using a second sensor to view a mold portion, such as the top of the mold;

DESCRIPTION OF THE PREFERRED EMBODIMENTS

FIG. 1

Figure 1C:
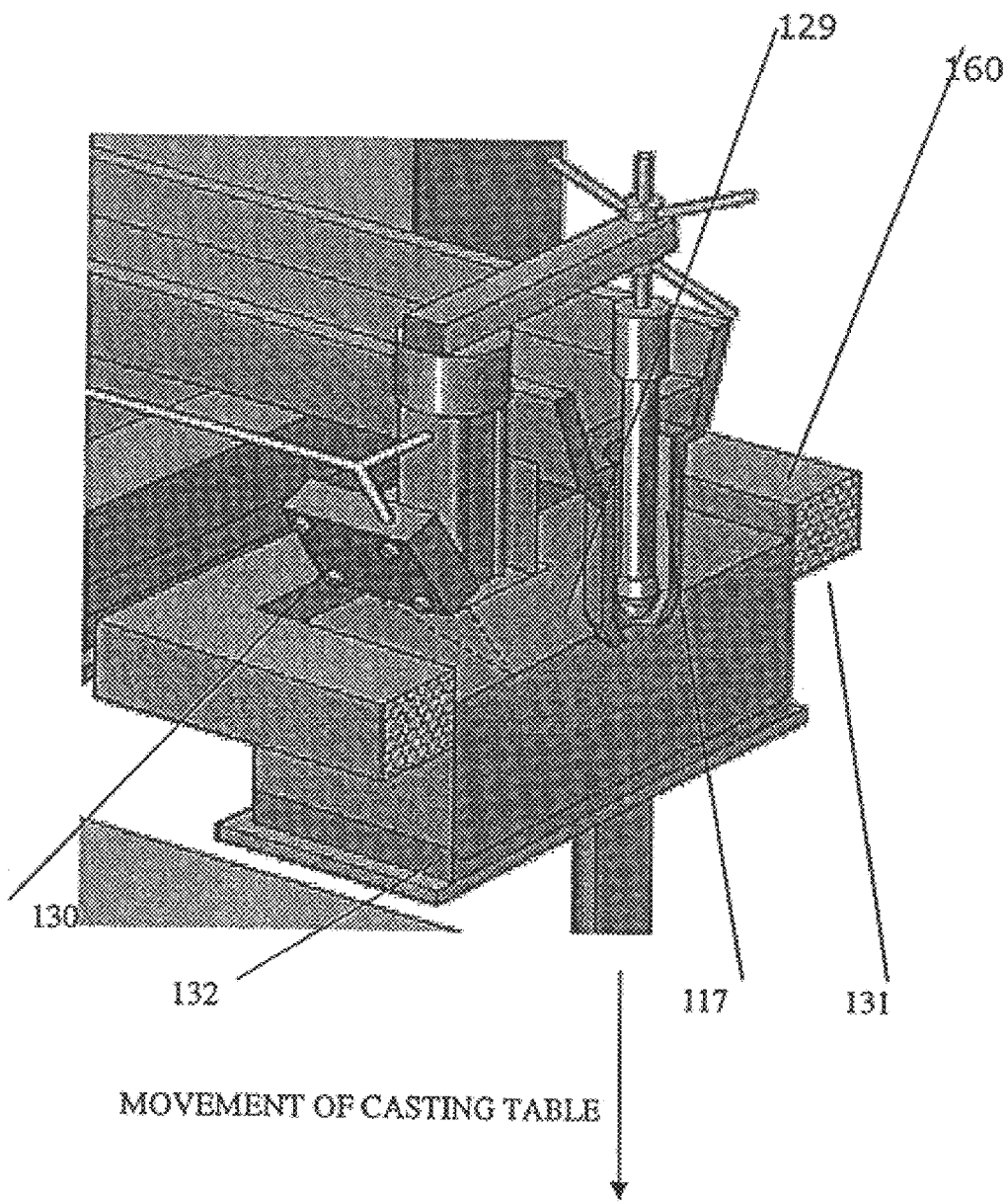
FIGS. 1(A–C) illustrate a 3 mold system of the prior art employing point triangulation sensors to determine molten metal height in molds.

FIG. 1 illustrates a system of the prior art employing point triangulation sensors to determine molten metal height in molds. A 3 mold system is shown for clarity, although systems with a larger (or smaller) number of molds are possible.

As shown in FIG. 1 (and in layout, in FIG. 1b) the sensor 100, typically a laser triangulation based sensor of the type described in the references above incorporated by reference herein, is attached to the trough 101 (or launder as it is called in the trade) and positioned to measure the height of molten metal surface 105 in mold 102. Alternatively, in some cases the sensor can also be mounted on a separate attachment or in some cases even be standing on the mold. The straight feeding launder (the launder portion over the molds), 101, is typically 6–7 m long. Controller 115 reads out the data from sensor 100 and using a pin type actuator/stopper 116 controls the flow of metal into the mold 102.

Similarly sensors 120 and 130 measure metal height in molds 121 and 131, respectively. All sensors are readout by controller 115 which controls the speed of ram 140 and the flow of molten metal from the pin type flow control valves such as 116 or 117. The launder is standing on the floor across the casting pit 106.

The current method to ensure calibration (and avoid that the launder is deformed by temperature changes) is to cool the outside of the launder, which is sometimes ineffective. The sensors used to sense mold height are typically attached to the launder, and their location vis a vis a mold such as 102 can vary, thereby providing potentially false readings of metal pour height, particularly at locations away from the end supports. It should be noted that during the whole cast (the process of pouring metal into the mold) radiant heat is working on the feeding launder from underneath, causing such distortion to occur, thereby modifying the position of any molten metal level sensors attached thereto or positioned nearby. This is also because the feeding launder is typically supported at its ends, and thermal distortion in-between the supports can be severe.

An added problem using conventional apparatus of today, is that, after the cast is complete, the feeding launder and all equipment attached to it is removed. A new calibration must be done prior to the next cast. The calibration procedure is different depending on supplier and technology used. The important level to reference the aluminum level to, is the top of the mold 160, shown in FIG. 1c.

The first problem this invention addresses, is an improved method for determining height of molten metal by differentially measuring a local reference point on the adjacent mold with respect to the metal surface in order to eliminate effects of launder distortion due to heat and other problems. Also disclosed is a better way to take data from the molten metal itself which as noted can have ripples, be obscured by steam or smoke, and have odd reflective characteristics due to oxide formation in certain locations which dynamically vary.

FIG. 1c illustrates a close up of a mold and pouring operation controlled by controller 115 which maintains a desired height of molten metal 129 in the mold 131 by controlling the position and movement of the casting table 132 and the flow rate of nozzle 117 using data from a laser triangulation sensor 130 attached, in this case to the feeding launder 101.

FIG. 2

FIG. 2 illustrates the use of a sensor providing a line of data from the molten metal and providing local reference calibration for the sensor, optionally using a second sensor to view a mold portion, such as the top of the mold.

Illustrated is the method and arrangement for gauging a distance between a reference surface 203 and the surface of an object, (in this case a molten metal surface 201, the arrangement including a sensor comprising an illumination means 202 and a camera means 260, in a triangulation arrangement such as disclosed in U.S. Pat. No. 5,362,970 and other references.

In this case, illumination means 202 illuminates both the reference surface of the mold 203 and the surface of the molten metal 201 using in this case a "fanned" laser beam, typically produced by a diode laser 207 expanded by cylinder lens 210 to form a line 215 which illuminates both reference surface 203 and molten metal 201. Ideally the laser and camera combination should be able to be operated at a Class 2 Laser safety rating.

A imaging lens 230 images the line 215 onto a matrix photo-detector array 240 (e.g., a CCD TV camera) which is equipped to scan the image and produce an output of profile of points in the image (see also FIG. 5 for a specific example). An angle "theta" between the imaging axes of lens 230 and the projection direction of laser 202, typically lying in the plane perpendicular to the plane of the drawing paper (rather than in-plane as shown, for ease of drawing), provides a triangulation effect as pointed out in the references which allows the height difference "h" between the reference surface and the molten metal to be determined at all points along the line intersection 215 with the metal, by scanning, with array 240, the image of the line projected on the metal 215 formed by lens 230. An interference filter 250 of bandpass approximately centered on the laser wavelength of laser 202 is useful to discriminate laser illumination from background radiation from the molten metal 201. Knowledge of "h" and the height of the reference surface 203 with respect to the starting surface on which the metal first contacts (e.g., 604 in FIG. 6), gives the Level L of metal in the mold.

A typical standoff distance of the sensor (from the front of the sensor to the center of the measurement range) to the molten metal is 500 mm, and should be if possible 300 mm or more from the molten metal at the lowest point in the mold. When so located, it is generally required to put the sensor in a water cooled box (whose window is cooled) or take other heat protection provision.

The reference surface, in this case surface 203 on a mold can be measured in its position at one point, but is preferably measured at a number of positions using a plurality of spots or along a continuous line of light.

The reference surface of the mold is typically "w"=100 mm wide. The level of the molten metal surface near (but not immediately adjacent the reference surface) should be measured approximately 50–100 mm from the edge "A" of the reference surface. There will be a meniscus close to the edge of the mold (or the refractory material in the launder) and the top of that meniscus is not what is needed.

In a preferred arrangement, the active measurement on the molten metal surface is desirably about 100 mm wide as well (zone "F") This means that the sensor (or sensors) should be capable of seeing a total width of approximately 300 mm. (Zone F plus 100 mm space, plus width of reference surface desired, which can be up to the total ref surface width W, typically 100 mm).

The depth "Z" of a mold is about 200–225 mm. To the best of my knowledge, a sensor measurement range of 250 mm will accommodate 100% of the mold depths used today.

It is noted that while the sensor measurement range of 250 mm is ostensibly needed, however, once the start up cycle is complete, one is only in the end trying to accurately control around a band which in Z located near the bottom of the mold which I estimate as a range of 100 mm max. Thus one can alternatively employ a two range sensor—a coarse range over the whole 250 mm, and a fine resolution over the bottom 100 mm of the mold where control needs to be tightest.

One could also use two sensors, one for each range as well, and program the control system accordingly. Or two sensors each spanning a different region in Z can be used. (e.g., the first covering the top 150 mm, and the second covering the bottom 100 mm).

From an accuracy point of view, using averaging in both time, and space (in the line extension direction across the mold) it is possible to make measurements which are stable to 0.2 or 0.3 mm. If the range is 250 mm, this then is a dynamic range of 1 part in 1000, generally achievable today with well constructed triangulation sensors (for example an LMI L-1 Line profiling sensor).

Alternative to projecting and imaging light from a whole line 215 of points at once, two (or more) individual sensors measuring the location of either a point or a line of points on the surface of the molten metal or, reference surface can be used, such as sensor 260 (dotted lines) used to determine the position of reference surface 203, and sensor 270 (dotted lines) used to determine the position of molten metal surface 201 (in a zone, such as in region F discussed above, away from the side wall of the mold where meniscus and other undesirable effects for control purposes lie). The two sensors are rigidly connected by a member 280 so that height measurements taken by each can be referenced to each other.

In this example sensors 260 and 270 are shown as point triangulation laser sensors, which could be commercially available LMI Selcom SLS 5000 types.

FIG. 3

Figure 3:
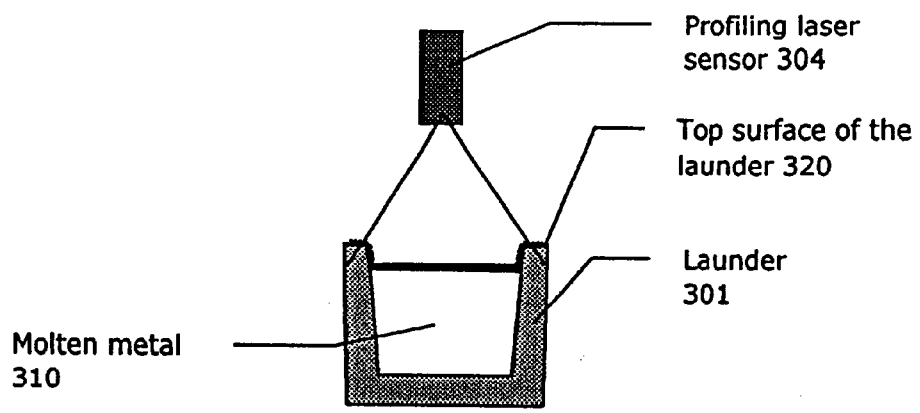
FIG. 3 illustrates control of metal height in the feed launder by a similar sensor arrangement.

It should also be noted that a spot or line sensor can be used to control height of metal in the feeding launder as well, also made possible with the invention. This is shown in FIG. 1 and FIG. 3 where a sensor 304 is placed in the feeding launder 301, and used to determine the height of molten metal 310 at multiple transverse locations in the launder with respect to the launder top surface 320 (or other suitable point on the launder)

The reference surface, in this case surface 320, can be measured in its position at one point, but is preferably measured at a number of positions using a plurality of spots or along a continuous line of light.

Launders normally are less than 300 mm deep but can also be up to 400 mm. (requiring a sensor measurement range to accommodate molten metal heights up to this amount in same). A typical standoff distance of the sensor (from the front of the sensor to the center of the measurement range) to the molten metal in a launder is 800–1000 mm.

FIG. 4

Figure 4:
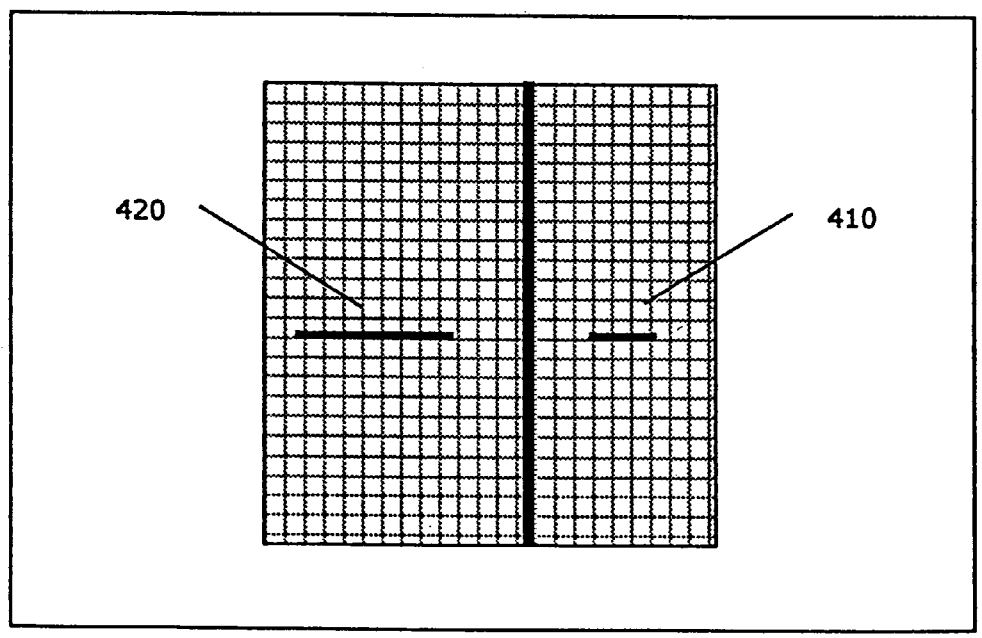
FIG. 4 illustrates one type of light compensation for molten metal reflectivity issues.

FIG. 4 illustrates one method of adjusting the sensor for the vast differences in reflectivity encountered between the reference surface and the molten metal surface.

The surface reflectivity from the reference surface of the mold can vary from cast to cast but is more or less constant during the cast. However, I have found in practice that the reflectivity from the molten metal surface is quite variant. It varies from cast to cast but also during the cast. The oxide layer that forms on the surface of the molten aluminum depends on the alloy, and the temperature of the Cast. When the cast is carried out low in the mold, the oxide layer is continuously dragged down the side of the slab, making the oxide on the top of the molten metal crack and split. This process can also give an extremely shiny (mirror like) surface to measure off of.

As noted above, the measurement area in the mold can also be more or less covered by steam causing multiple false readings to account for as these readings appear as increases in level, in the direction toward the sensor. I have usually done this by rejecting all readings outside an expected level height band which relates to the previously determined information. Measurements within the band are preferably averaged to obtain correct results.

The sensor, as shown in FIG. 4 may be defined in two areas; the reference measurement area, in which a line of data 410 is taken from the reference surface and the molten metal surface area in which a line of data points are taken 420 in order to determine the distance h (in the direction out of the plane of the paper) between the reference surface and the surface of the metal. In this particular instance the light power illuminating the respective lines, and/or the detector array characteristics such as integration time or scan rate, are switched between the areas to allow accurate measurements from both to be taken. Of course if separate sensors are used for each area, each can be optimally controlled for the reflection characteristics of the area in question.

Solutions to problems of obtaining correct readings from variant reflection surfaces using Matrix array based sensors are also possible in other ways, and such are discussed at length in U.S. Pat. No. 5,362,970. Measures taken can preferably include any or all of the following sensor control regimes: variation of laser power, laser pulse width or frequency, or other variables and/or array integration time, array scan rate or other variables.

FIG. 5

FIG. 5 illustrates a preferred casting control sequence of the invention particularly in the critical first stages. Accuracy demands are stringent as it is desired to cast as low as possible in the mold to get the best surface result on the billet sides coming out of the mold. This makes it desirably to safely reach a low in the mold casting state as soon as possible, and to accurately keep it there.

Figure 5A:
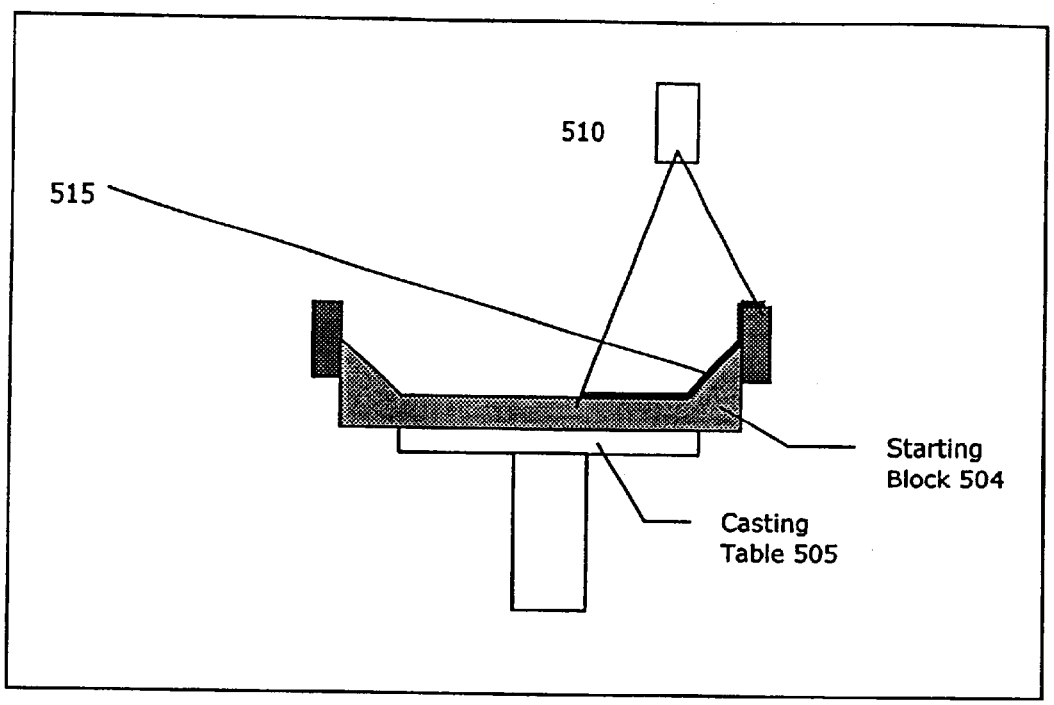
FIGS. 5(A–B) are a description of a preferred Start-up and Control procedure of the invention

FIG. 5a illustrates a mold at the start of a pouring cycle, with no molten metal yet poured in the mold. As metal is poured in, the casting table 505 with starting block 504 moves down and the sides of the molten metal cool, forming the billet. A preferred sequence of operations is as follows.

When the metal is coming into the feeding launder 101 the actuators such as 116 or 117 are set to an initial opening position. This is done to ensure a fast initial fill rate and to prevent the metal from freezing in the nozzles such as 103.

Figure 5B:
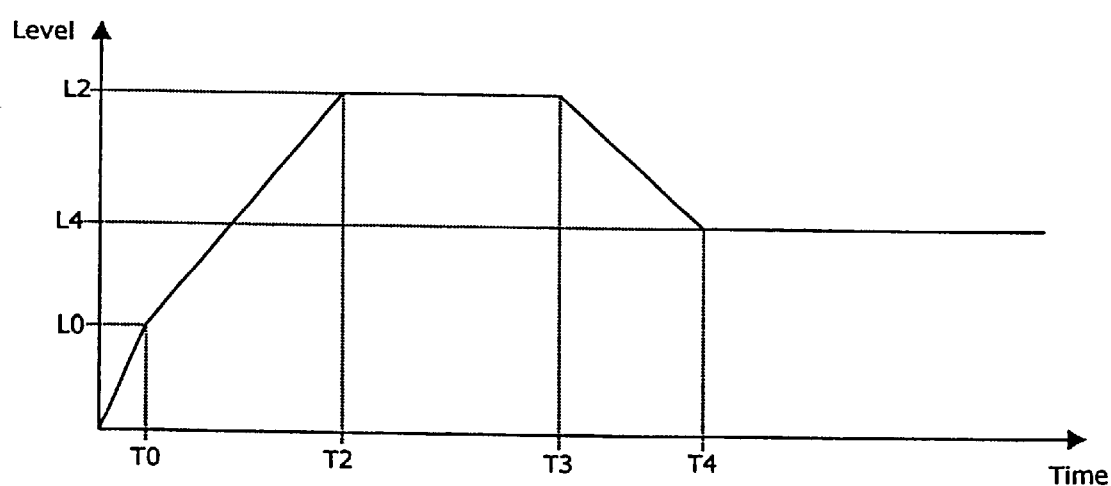

When the sensor reads a certain preset level, L0, in FIG. 5b, the control system 115 takes control of the filling. All molds are controlled to reach the final preset start level, L2, at the same time (at the beginning of the filling, the mold closest to where the metal enters will be filled first (e.g., mold 102 in the FIG. 1 diagram) and the last mold being fed from the launder will be filled last. This situation is controlled by individual mold level control of the nozzles before the casting table 505 is to start the drop.

At this point, T2, the level is high in the mold (level L2 as shown, corresponding to a relatively small value of "h") to ensure solidification and to ramp up casting speed and water cooling safely. When this is stable, at time T3 the casting table is moved so as to ramp down the level in the mold to the desired casting level, L4 shown, reached at time T4. After that point, the sensory control system maintains the level at level L4 through computer control of the pour rate as a function of the sensed data. Pouring parameters of each mold in the cast are preferably individually controlled to the extent possible.

To properly control the pouring process as described above, I feel that the control system should preferably work at 10 Hz or greater.

The mold level measurement sensors should preferably work at rates greater than 100 hz, and even more preferably even 1000 Hz, such that an associated computer program can sort out bad readings, and low-pass filter and/or average the remaining readings (which can be oscillating somewhat) in time to produce a reliable level measurement—desirably, but not necessarily 20 times per second. The teachings of U.S. Pat. No. 4,667,231, can be employed here as well.

Preferably, a reading of the reference surface could be done every 10 sec, unless vibration or other short term effects need to be considered (as opposed to the long term heat related drift in sensor position).

FIG. 6

Figure 6:
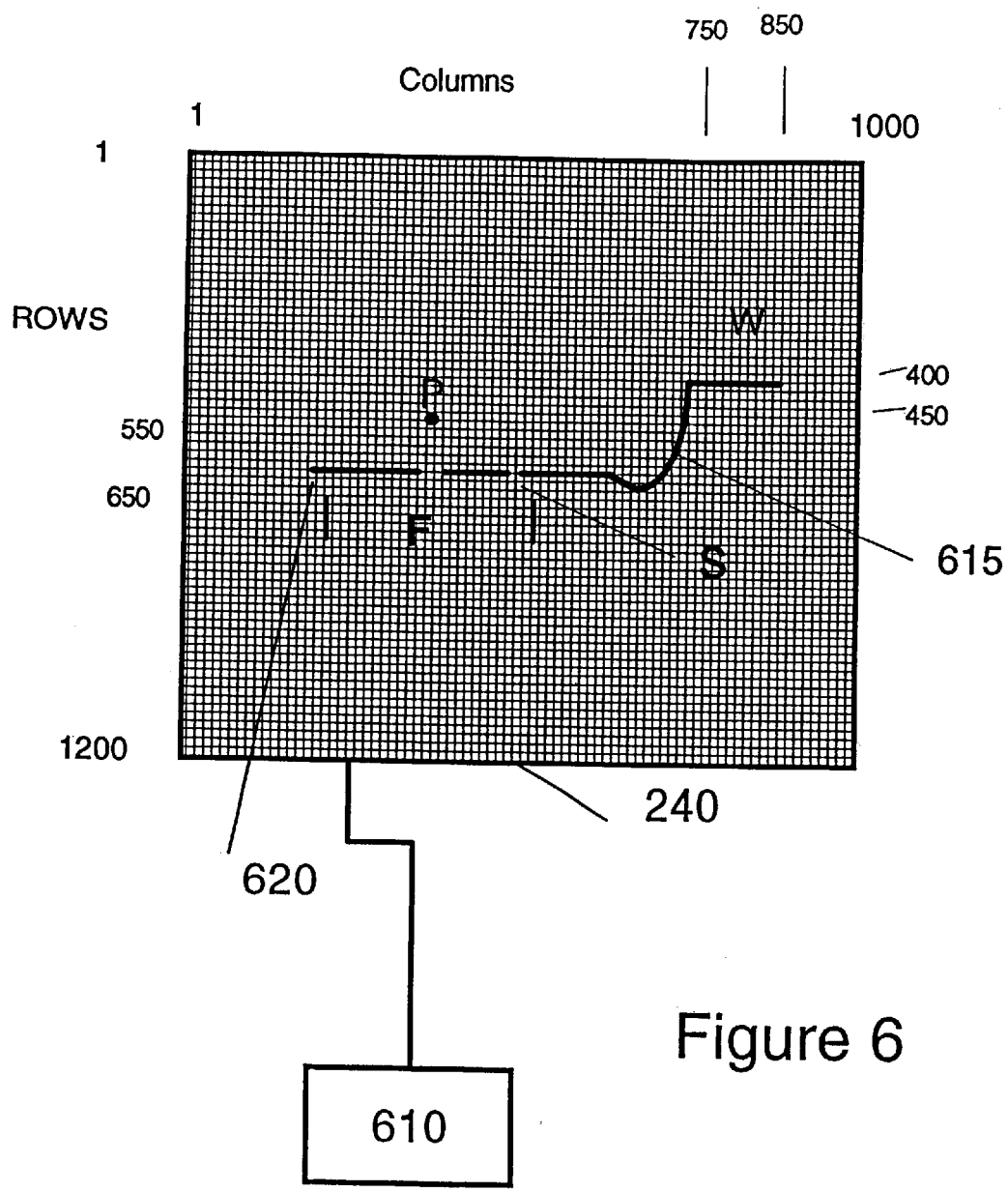
FIG. 6 illustrates sensor techniques to meet control requirements, including use of a pixel addressable camera which is advantageously employed for determining molten metal and mold locations.

FIG. 6 describes sensing techniques to meet the criteria above. For sensors using a line of points, or a number of discrete points, many opportunities for signal processing to aid measurement can be performed.

For example, consider line of data on array 240 in FIG. 6 (corresponding to array 240 in FIG. 2), which is connected to computer 610 (not to scale) in controller 115. Array 240 in this case is a 1200×1000 type, having 1200 rows and 1000 columns of pixels.

In operation, the pixel region 'F' on the array corresponding to the returned line section image 615 of line 215 in the metal region away from the mold sides, and the pixel region "N" corresponding to the top of the mold are interrogated to find the row values of pixels which correspond to the metal and mold respectively.

A first preferred step in processing the data obtained to obtain the effective molten metal location and therefore height of same in the mold (on comparison with mold surface location or other related parameters), is to look for and generally reject outlying data, such as point "P" which is likely caused by a return signal from a large amount of steam and smoke cause a sensing problem, as a projected spot can hit both steam and metal, or just the steam itself. This point is ignored, as it is far away from the other points (to which a curve or line such as line 620 can be fitted if desired. It is noted that the fitting of a curve (a straight line best fit in most cases) to the molten metal allows one as well to take out undulations in the metal due to vibration and pouring effects, and to average over problems of scale and the like. Alternatively a simple average may be made of the expected region of the liquid metal surface.

It is noted that in some cases, as in point "S", data can drop out entirely due to scale or other surface problems. These too are eliminated in the fitting of the line.

A final check as to the data accuracy is made if desired, by observing the location of the liquid level itself. This location should be within a predictable band, given known nozzle flow rates and ram movements. If it isn't there, a condition of massive obscuration can be predicted and other data points along the molten metal surface searched for. If none exist, then a possible fault signal is sounded or some other alert is preferably given to the control system.

It is also noted that the top of the mold in width region W doesn't generally move relative to the sensor, or if it does, moves slowly and a small amount, as the sensor is in general relatively fixed with respect to the mold during the pour (aside from aforementioned distortion of the feeding launder due to temperature). Thus it is only necessary in region W to scan a small number of rows of the array to determine this data, especially once the top of the mold has been first found.

As shown, in the diagram of FIG. 6, the pixel rows 400 to 450 are so scanned, and even then, only pixels in columns 750–850 need be interrogated to find the mold surface W. A pixel addressing array, such as a an ElecVision CMOS type is very useful for this, as only those pixels needed need be scanned. In addition, only the pixels in columns corresponding to region F need be scanned. And even here, the amount of movement from the position of a previous scan is not much, so that once molten metal level is determined, only a small number of rows only need to be scanned here as well—related to the previous level value (and corresponding average row number represented). For example, in the case shown, it might be possible to only scan rows 550 to 650 (or fewer even) to determine molten metal location in zone F, since on the previous scan, the location of the metal surface would have been determined to be effectively centered on row 580 for example, and it was predicted that the level was going lower during the period t3 and t4 in FIG. 5b. Alternatively if the situation was in steady state more or less the situation at time t4 or greater, one could just look at the same rows on each scan, as the pour was controlled within the tolerance needed to keep the molten metal in this range.

This means that if a pixel addressing array is used, then in any one scan and using the intelligence gained on previous scans, only let us say 60 rows, for example, need be scanned (though not the same 60 rows in regions F and W). If the array has 1200 rows (more or less the state of the art today), this means that only 1/20 or less of the normal frame time is required. This means that over 1000 scans per second of all the pixels in these rows could be made—if needed for control purposes. Even more particularly, over 1000 scans a second of the predicted line location in region F could be made, with say 1 scan per second in region w (which is slowly changing or invariant during the pour depending on sensor mounting stability).

Proportionately faster results accrue if only a fraction of the available columns in each row are read, as is often desirable, since region F and Region W can occupy substantially less than the total number of columns of the array.

If a pixel addressing array is not used, the whole frame of pixels needs to be read out, and thus the rate would normally be limited to 30–50 scans per second. Thus the pixel addressing type is considerably more useful for control purposes when lines of data points are needed to accurately determine molten metal height under a variety of conditions.

A further discussion and recap of processing of transients in the measurement signal form the molten metal sensors of the invention follows.

False (transient) level measurements from a molten metal surface can have their origin in one or more of the following reasons, which have been seen in my previous work using a single spot analog sensed triangulation based sensor such as 130 (e.g., the LMI Selcom SLS 5000, which is based on a PSD or position sensing photodiode) to look at the metal surface.

Smoke and fire;

Steam;

Air born dust;

Secondary reflections;

Dross or slag on the measured surface;

Invalid readings (typically caused by rapid surface reflectivity changes).

By using multiple spots or a line together with a digital detector (line or matrix) the effect of the above named sources of false measurements can be eliminated or at least vastly reduced. An iterative process can be used calculating the actual working level of the molten metal and using different criteria to quantifying and qualifying the information captured from points along the width of the measurement.

The data qualifying process should preferably be able to handle two cases:

The dynamic state, when the level set-point is supposed to change according to a predetermined curve, e.g. a ramp ($L=K*t+c$, cmp. FIG. 5, changing level from L0 to L2 or L2 to L4).

The static state, when the level set-point is a constant, C.

The measurement data will be available in data arrays, D, with M number of elements. The quantification and qualification of individual data items in data array D, will be made by comparing data items within the array itself ($D_n$). In steady state, previous data arrays ($D_{n-1}$, $D_{n-2}$, ...) will also be used. Data items in data array D that are found outside tolerances will be excluded in calculating the resulting output array O ($O_n$). Each such item then can be updated to a calculated value. The information in output array O can then be segmented and relative information can be calculated, e.g. two segments defined as Reference segment and Level segment where the difference ($O(R)-O(L)$) will give the relative distance between the two segments.

The information in measurement data array D can also be used for calculation of vibration, ripple or wave behavior of the measured surface. Such data can be useful for controlling the pouring operation. Where indications of data from steam occurs, this can be an indication of excessive steam conditions which can indicate water control problems or other issues in the pouring operation.

Methods:

The methods described below are not complete or to be considered correct programming language, and are provided to describe the data qualifying and quantifying process.

(Dynamic state (BOOLEAN), Tolerance(Dynamic case), Tolerance(Static case)(REAL), X and Y (INTEGER) are parameters).

Data array D:

$D_{n-1}$

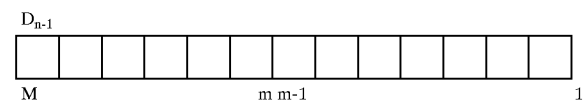

M                    m m-1                  1

$D_n$

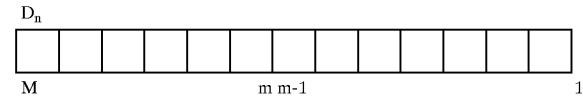

M                    m m-1                  1

Output array O:

$O_{n-1}$

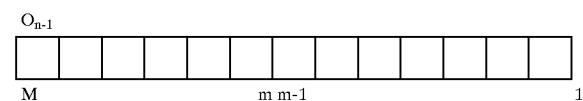

M                    m m-1                  1

Each item consist of two fields: VALUE and VALID

The dynamic state (Dynamic state=TRUE):

Evaluation of data within data array ($D_n$):

FOR m=2 TO m=M

IF ABS(($D_{n,m}$(VALUE))-($D_{n,m-1}$(VALUE)))<Tolerance (Dynamic case)

THEN ($D_{n,m}$(VALID))=TRUE

ELSE ($D_{n,m}$(VALID))=FALSE

IF number of data items=TRUE<X% of M THEN all items in output array ($O_n$) are marked FALSE and equal to data array ($D_n$)

ELSE

Using all data items=VALID, calculate the output array ($O_n$) and mark all output items=VALID Start evaluation of new measurement data (n=n+1)

The static state (Dynamic state=FALSE):

Evaluation of data within data array ($D_n$) and using calculated data from previous measurement cycles ($O_{n-1}O_{n-2}$):

FOR m=2 TO m=M

IF ABS(($D_{n,m}$(VALUE))-($D_{n,m-1}$(VALUE)))<Tolerance (Static case) AND

IF ($O_{n-1}$)(VALID)=TRUE THEN
ABS(($D_{n,m}$(VALUE))-($O_{n-1,m}$(VALUE)))<Tolerance (Static case)

ELSE

IF ($O_{n-2}$)(VALID)=TRUE THEN
ABS(($D_{n,m}$(VALUE))-($O_{n-2,m}$(VALUE)))<Tolerance (Static case)

THEN ($D_{n,m}$(VALID))=TRUE

ELSE ($D_{n,m}$(VALID))=FALSE

IF number of data items=TRUE<Y% of M THEN all items in output array ($O_n$) are marked FALSE and equal to data array ($D_n$)

ELSE

Using all data items=VALID, calculate the output array ($O_n$) and mark all output items=VALID Start evaluation of new measurement data (n=n+1).

Other Points

It should be noted that the sensors described herein, very desirably should be able to have sufficient measurement range to read the height of the reference surface 130 and the position of the bottom block, 135. This has not been possible successfully heretofore with other non-contact sensors such as capacitive and inductive sensors mainly due to measurement range limitations The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention.

What is claimed:

1. A method for controlling a metal pouring operation comprising the steps of:

sensing information relating to the height of a portion of a mold into which said metal is poured;

sensing information relating to the height of molten metal in said mold; and using said sensed information, controlling the pouring of molten metal into said mold.

2. A method according claim 1 comprising the further step of determining said molten metal height at a plurality of surface locations thereof.

3. A method according claim 1 comprising the further step of determining said mold portion location at a plurality of positions on said mold.

4. Apparatus for controlling a metal pouring operation comprising:

a sensor for determining information relating to the height of a mold into which said metal is poured;

a sensor for determining information relating to the height of molten metal in said mold; and a control system using said determined information for controlling the pouring of molten metal into said mold.

5. Apparatus according to claim 4 wherein the same sensor is used for determining both information from the mold height and the molten metal height.

6. Apparatus according to claim 4, wherein at least one of said sensors is an electro-optical sensor.

7. Apparatus according to claim 6, wherein said sensor operates by laser triangulation.

8. Apparatus according to claim 6, wherein said sensor operates using a projected line of laser radiation.

9. A method for controlling a metal pouring operation comprising the steps of:

at a given point in time, at multiple positions on a surface of a molten metal being poured into a mold, sensing location information about said molten metal within said mold;

determining from said information, the surface location of said molten metal; and using said information, controlling the pouring of molten metal into said mold.

10. A method according claim 9 comprising the further step of sensing said information at multiple points in time.

11. A method according claim 9 comprising the further step of ignoring outlying data points in said sensed information.

12. A method according claim 9 comprising the further step of fitting a straight line to said information from said multiple locations.

13. A method according to claim 9 comprising the further step of ignoring from said information effects of steam or smoke.

14. A method according to claim 9 comprising the further step of determining from said information, effects of vibration.

15. A method according to claim 9 comprising the further step of determining molten metal wave effects from said information.

16. Apparatus for controlling a metal pouring operation comprising:

a sensor to determine, at multiple positions on a surface of a molten metal being poured into a mold, location information about said molten metal within said mold;

a computer, to determine from said information, the effective surface location of said molten metal; and a controller employing said determined effective surface location for controlling the pouring of molten metal into said mold.

17. Apparatus according claim 16 wherein said sensor determines said information at multiple points in time.

18. Apparatus according claim 16 wherein said sensor ignores outlying data points in said sensed information.

19. A method according to claim 9 comprising the further step of fitting a straight line or curve to said information from said multiple locations.

20. A method according to claim 1 or 9 in which sensed information from said molten metal is taken from regions of the mold spaced from the sides of said mold.

21. A method according to claim 20 wherein said space is at least 20 mm.

22. A method according to claim 1 or 9 wherein said molten metal sensor is located to standoff at least 300 mm from the surface of said molten metal at its lowermost position in the mold.

23. A method according to claim 1 or 9 wherein said molten metal sensing is performed electro-optically.

24. A method according to claim 1 or 9 wherein said sensing of molten metal location employs a pixel addressable photo-detector array.

25. A method according to claim 1 or 9 wherein said molten metal sensing is performed using information gleaned from a previous sensing operation.

26. A method according to claim 1 or 9 wherein said sensing uses less than the total number of rows of pixels in a photo detector array.

27. A method according to claim 1 or 9 wherein said sensing uses less than the total number of columns of pixels in a photo detector array.

28. A method according to claim 1 or 9 wherein said sensing employs laser triangulation using a laser line projection.

* * * * *